Oct. 15, 1963  W. E. ROBBINS  3,106,807
MACHINE FOR GRINDING SURFACE ON FIFTH WHEEL KINGPIN
Filed Sept. 19, 1960  2 Sheets-Sheet 1
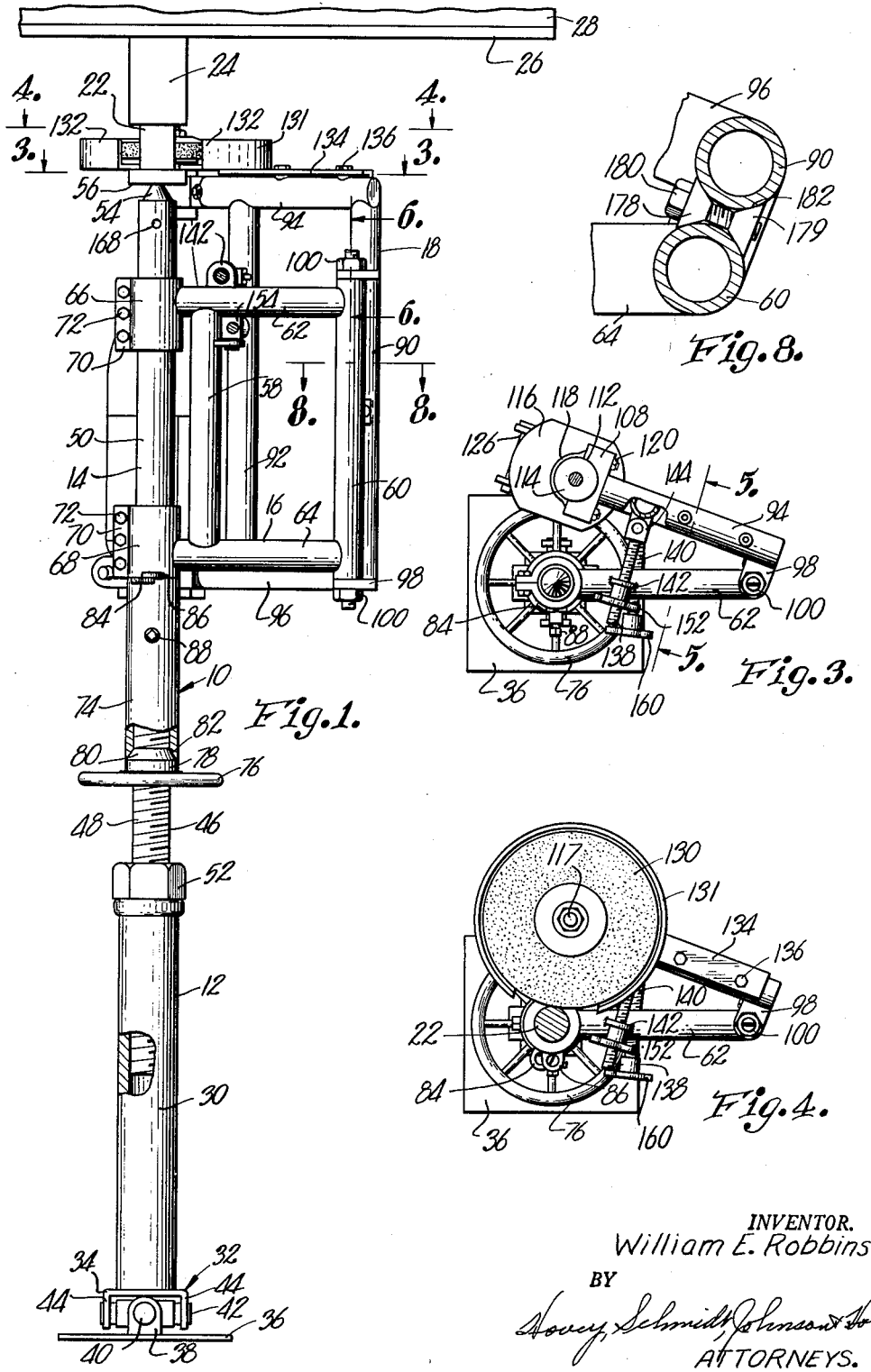
INVENTOR.
William E. Robbins
BY
Hovey, Schmidt, Johnson & Hovey
ATTORNEYS.

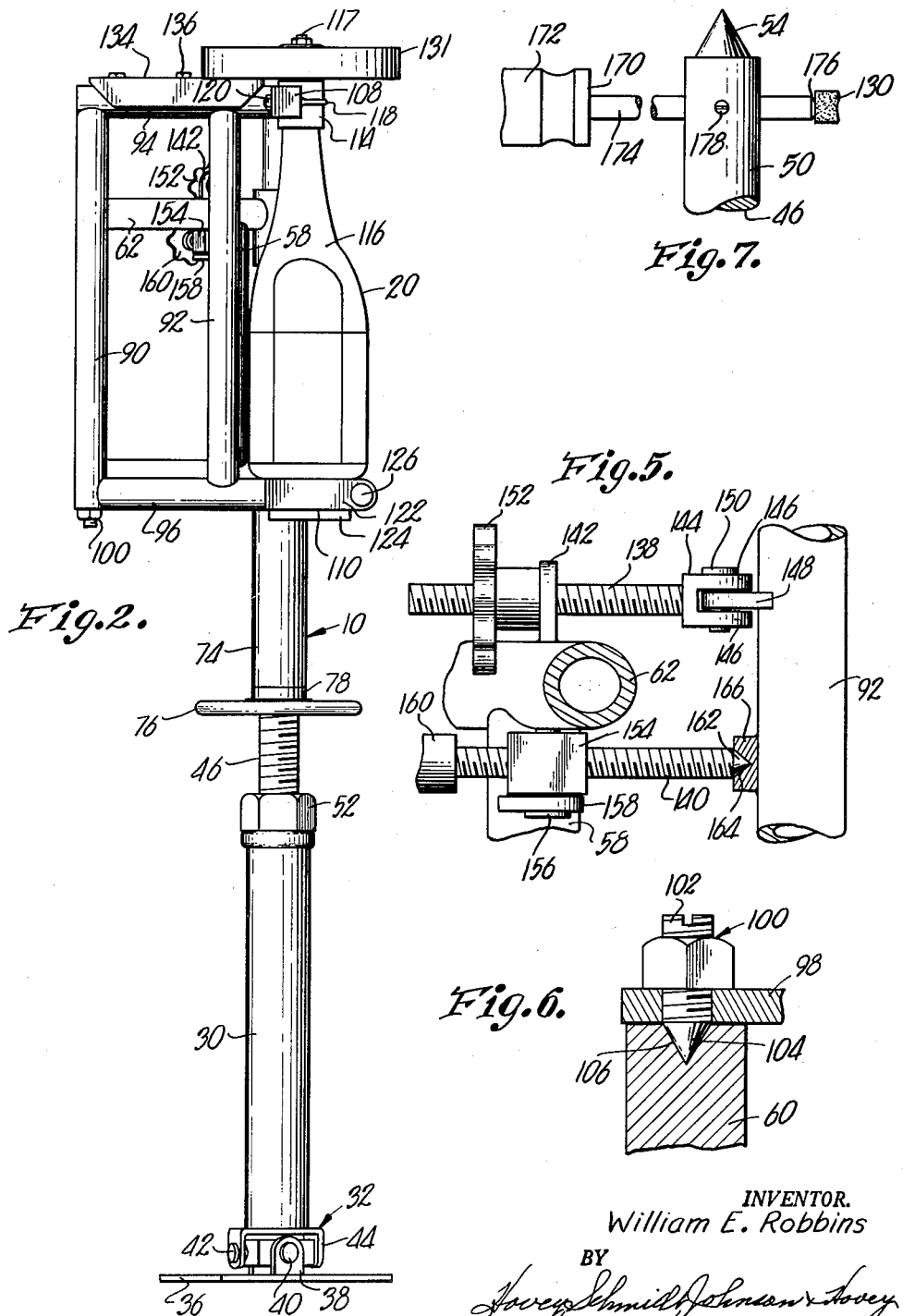

United States Patent Office 3,106,807
Patented Oct. 15, 1963

3,106,807
MACHINE FOR GRINDING SURFACE ON FIFTH
WHEEL KINGPIN
William E. Robbins, 508 E. Dryden, Odessa, Mo.
Filed Sept. 19, 1960, Ser. No. 56,843
8 Claims. (Cl. 51—241)

This invention relates to machines for accurately grinding the external surfaces of elongated devices, and, more particularly, to grinding machines of the type for orbiting the device as the latter is being ground.

In the conventional fifth wheel devices used with tractor-trailer combinations, provision is made on the tractor portion of the device for receiving an elongated kingpin on the trailer portion for coupling the trailer with the tractor. The kingpin is normally complementally fitted through an opening in the tractor portion so as to preclude the presence of slack between tractor and trailer and thereby assure positive response of the trailer when the tractor accelerates. Over extended periods of use, the bearing surface of the kingpin, due to the constant contact with the tractor portion, begins to wear away and thereby give rise to slack between tractor and trailer, a condition capable of causing damage to the cargo of the trailer and discomfort to the driver of the tractor. Attempts have been made to replace the worn kingpin with a new kingpin by welding the latter to the mounting plate on the underside of the trailer to which the kingpin is normally attached. This procedure is extremely difficult, since it is not easy to mount the new kingpin so that the same is substantially perpendicular to the mounting plate, a requirement necessary for coupling the kingpin with the tractor portion of the fifth wheel device. Other attempts have been made to replace both the kingpin and the mounting plate, but the expense of this measure is great, since the structure of the trailer must be altered to replace the old mounting plate with the new plate.

The present invention circumvents the problem described above by accurately grinding the bearing surface of the kingpin to the design requirements thereof while the kingpin remains on the mounting plate and after the surface has been built up sufficiently by welding thereto a quantity of material which effectively increases the diameter of the kingpin. The machine which is the subject of this invention provides means thereon for mounting the grinding means so that the same orbits the kingpin and thereby precludes the necessity of removing the same from the mounting plate to grind the kingpin to the design requirements.

It is therefore the primary object of the present invention to provide a machine capable of orbiting the surface of an elongated device to be ground whereby the device may remain stationary during the grinding operation.

Still another important object of the present invention relates to the provision of a machine having grinding means thereon engageable with a surface to be ground, which machine is provided with shiftable means thereon for maintaining the grinding means in a fixed position relative to the surface, whereby the latter may be accurately ground to a predetermined size to thereby conform precisely to the design requirements thereof. Yet another important object of the instant invention is the provision of a machine for grinding the bearing surface of a kingpin forming a part of a fifth wheel device of a tractor-trailer combination, which machine is provided with a grinding wheel thereon capable of orbiting the kingpin as the latter is being ground, whereby the kingpin may be ground to design specifications as the same remains mounted in its operating position.

A further important object of this invention is the provision of a machine for grinding the bearing surface of a kingpin after the same has been built up by welding thereto a material effectively increasing the diameter thereof, whereby the original kingpin of a fifth wheel device may be utilized to thereby preclude the replacement thereof with a new kingpin.

Other important objects of this invention relate to the provision of a machine for grinding a kingpin of the type described, which machine includes an elongated shaft rotatably carrying a grinding means thereon engageable with the pin, whereby the grinding means may grind the kingpin while rotating about such shaft; to the provision of a pair of relatively shiftable frames carried by the shaft and mounting a power-operated grinding wheel thereon whereby said wheel orbits the surface to be ground; to the provision for means for selectively maintaining the frames in a fixed position so that the surface may be ground to a greater or lesser degree; to the provision of means on the shaft for raising and lowering the grinding means so that the effective range of the latter is increased; and to the provision of a grinding wheel rotatable about an axis parallel with the longitudinal axis of the kingpin to be ground.

Other objects of the instant invention will become apparent as the following specification progresses, reference being had to the accompanying drawings.

In the drawings.

FIG. 1 is a fragmentary, cross-sectional side elevational view of the grinding machine which is the subject of this invention;

FIG. 2 is a side elevational view of the grinding machine of FIG. 1 illustrating the power-actuated grinding means thereon together with means mounting the same on an upright, elongated shaft;

FIG. 3 is a cross-sectional plan view of the instant device taken along line 3—3 of FIG. 1;

FIG. 4 is a cross-sectional plan view taken along line 4—4 of FIG. 1;

FIG. 5 is a fragmentary, cross-sectional side elevational view taken along line 5—5 of FIG. 3;

FIG. 6 is a fragmentary, cross-sectional side elevational view taken along line 6—6 of FIG. 1;

FIG. 7 is a fragmentary, cross-sectional side elevational view of the upper portion of the elongated, upright shaft forming a part of the instant invention; and FIG. 8 is a fragmentary-cross sectional plan view taken along line 8—8 of FIG. 1.

The grinding machine which is the subject of this invention is broadly denoted by the numeral 10 and comprises a support 12, elongated structure 14, a first frame 16, a second frame 18 and a grinding means 20. Grinding machine 10 is adapted to grind the bearing surface 22 of a kingpin 24 secured to a mounting plate 26, the latter in turn being secured to the underside 28 of a trailer forming a part of a tractor-trailer combination.

Support 12 comprises an elongated, tubular member 30 adapted to be mounted in an upright position by virtue of a universal joint 32 secured to member 30 at the lower end of the latter. Universal joint 32 includes a U-shaped bracket 34 mounted on member 30, as by welding, a flat plate 36 adapted to be disposed upon a base substantially at ground level, a pair of opposed ears 38 secured to plate 36, as by welding, and a pair of mutually perpendicular pins 40 and 42 interconnecting bracket 34 with ears 38. Pin 42 is journaled in openings in opposed legs 44 of bracket 34 and pin 40 is journaled in openings in ears 38, it being noted that pin 40 passes through an opening (not shown) through pin 42 intermediate the ends of the latter so as to permit pin 42 to rock about an axis corresponding to the longitudinal axis of pin 40. It is clear that member 30 is rockable about the axes of pins 40 and 42 so as to assume a plurality of angular positions relative to the base upon which plate 36 is disposed.

Structure 14 comprises an elongated shaft 46 having a lower, externally threaded stretch 48 and an upper stretch 50 having a smooth outer surface and integral with lower stretch 48. Lower stretch 48 is disposed within member 30 and is longitudinally shiftable relative thereto by virtue of a nut 52 threadably mounted on lower stretch 48 and resting on the upper end of member 30. Shaft 46 is shifted longitudinally of member 30 by rotating nut 52 so that grinding machine 10 may accommodate kingpins spaced various distances above the base on which plate 36 is disposed.

Upper stretch 50 of shaft 46 is provided with a frusto-conical, upper extremity 54, the uppermost portion of the latter being received within a depression (not shown) in the lower surface 56 of kingpin 24, whereby kingpin 24 is supported by shaft 46, member 30 and universal joint 32, it being noted that kingpin 24 bears against extremity 54 of stretch 50 by virtue of the weight of the trailer to which mounting plate 26 is attached.

First frame 16 includes a pair of spaced, upright sections 58 and 60 and a pair of spaced, transverse sections 62 and 64 secured to respective ends of upright sections 58 and 60 as is clear in FIG. 1. Upright sections 58 and 60 are substantially parallel with shaft 46 and upright section 60 is preferably of a solid material for a purpose hereinafter described, whereas, upright section 58 and transverse sections 62 and 64 may be tubular. The ends of transverse sections 62 and 64 extend laterally from the connections thereof with upright section 58 and which ends are connected to upper and lower collars 66 and 68 respectively surrounding upper stretch 50 of shaft 46 and slidable relative thereto. Collars 66 and 68 are in the form of split rings, each having flange means 70 thereon for receiving a plurality of bolts 72 threadably mounted in flange means 70 for increasing or decreasing the effective diameters of collars 66 and 68.

Means are provided on shaft 46 for raising and lowering first frame 16 relative to shaft 46 and comprise a sleeve 74 disposed on shaft 46 and shiftable relative thereto, and a manually operated hand wheel 76 threadably mounted on lower stretch 48 of shaft 46 below sleeve 74 thereon. Hand wheel 76 is provided with an extension 78 thereon having an upper beveled edge 80 engageable with and complementally receiving lower beveled edge 82 of sleeve 74 for urging the latter upwardly as hand wheel 76 moves upwardly and to permit sleeve 74 to be lowered as hand wheel 76 is lowered. A pair of projections 84 and 86 are disposed upon the upper end of sleeve 74 and the lower end of collar 68 respectively, each of projections 84 and 86 being provided with an opening therethrough for receiving a pin when the openings are aligned, so as to preclude relative movement between first frame 16 and sleeve 74. Sleeve 74 is provided with a set screw 88 threadably mounted through an opening in sleeve 74 and engageable with shaft 46 to preclude movement of sleeve 74 relative to shaft 46.

Second frame 18 is comprised of a pair of spaced, upright segments 90 and 92 substantially parallel with upright sections 58 and 60 of first frame 16, and a pair of spaced, transverse segments 94 and 96 connected to the upright segments 90 and 92 at the ends thereof, it being noted that the ends of transverse segments 94 and 96 extend laterally beyond the connection thereof with upright segment 92.

Upright segment 90 is provided with a pair of spaced ears 98 secured thereto proximal to the upper end thereof and at the lower end thereof, which ears 98 are provided with aligned openings therethrough for receiving pivot means 100 therethrough. It is also noted that ears 98 are spaced apart a distance equal to the length of upright section 60 of first frame 16 so that the latter may be inserted therebetween and operably coupled to second frame 18 by means of pivot means 100. As is clear in FIG. 6, pivot means 100 comprises a screw 102 passing through the opening in the respective ear 98, screw 102 having a frusto-conical extremity 104 which is complementally received in a recess 106 in the respective end of upright section 60. It is clear, therefore, that second frame 18 may swing relative to first frame 16 about an axis through screws 102, the latter axis being the longitudinal axis of upright section 60. Second frame 18 may be removed from first frame 16 by retracting screws 102 from within recesses 106 of upright section 60.

The ends of transverse segments 94 and 96 spaced from upright segments 90 and 92 are provided with means thereon for mounting a power-actuated grinding means 20 and comprises a bracket 108 secured to the end of transverse segment 94 and a yoke 110 secured to the end of transverse segment 96. Bracket 108 is provided with a semi-circular depression 112 therein for receiving the cylindrical neck 114 of grinding means 20, the latter being shown as a housing 116 containing an electric motor (not shown) and a rotatable shaft 117 operably coupled with the motor and extending upwardly therefrom through neck 114. Neck 114 is held within depression 112 by virtue of a semi-circular band 118 having externally threaded ends received in spaced openings of bracket 108 and secured to the latter by means of nuts 120.

Yoke 110 is secured to transverse segment 96 and is provided with legs 122 surrounding the base 124 of housing 116, legs 122 being releasably held against base 124 by virtue of nut and bolt means 126 passing through aligned openings in legs 122. Housing 116 is mounted on second frame 18 so that shaft 117 is substantially parallel with shaft 46, it being clear that grinding means 20 is swingable with second frame 18 relative to first frame 16 by virtue of pivot means 100 and grinding means 20 is rotatable about shaft 46 by virtue of collars 66 and 68, first frame 16 and second frame 18.

Guard means 128 are provided on second frame 18 for surrounding a grinding wheel 130 secured to shaft 117 above neck 114 to prevent ground material from being thrown outwardly from wheel 130 along a tangent thereto when wheel 130 is being utilized to grind a surface. Guard means 128 includes a strip of material bent in the form of a circle to surround wheel 130 and provided with spaced ends 132 between which wheel 130 projects to present a region for engaging a surface to be ground. Strip 131 is secured to an elongated strap 134 of rigid material, as by welding, and strap 134 is releasably secured to transverse segment 94 by bolts threadably received in openings in the latter.

Means for maintaining first and second frames 16 and 18 in a fixed position relative to each other comprises a pair of threaded rods 138 and 140 carried by transverse section 62 and engageable with upright segment 92. Rod 138 passes through an upright lug 142 secured to transverse section 62, as by welding, and rod 138 is provided with a bifurcated end 144 having arms 146 provided with aligned openings therein. Arms 146 are swingably secured to a transverse lug 148 secured to upright segment 92, as by welding, by virtue of a pin 150 inserted through the openings in arms 146 and an opening through transverse lug 148. A hand wheel 152 is threadably mounted on rod 138 and engageable with upright lug 142 to limit the movement of second frame 18 away from first frame 16. Hand wheel 152 is shiftable along rod 138 to permit second frame 18 to move away from first frame 16.

Rod 140 provides a stop means for limiting the movement of second frame 18 toward first frame 16. Rod 140 is threadably mounted through an opening in an element 154 which is pivotally mounted on a pin 156 passing through an opening (not shown) therethrough laterally spaced from the opening receiving rod 140 and transverse thereto. Pin 156 is releasably secured in transverse section 62 and pin 156 is maintained in a vertical position by passing through an opening in a transverse lug 158 secured to upright section 58, as by welding. A hand wheel 160 is secured to one end of rod 140 for manually manipulating rod 140 so that the opposite extremity 162 of rod 140 may be received complementally within a recess 164 of a boss 166 secured to upright segment 92, as by welding. It is clear that rod 138 limits the outward swinging movement of second frame 18 relative to first frame 16 and rod 140 limits the inward swinging movement of second frame 18 relative to first frame 16.

In operation, grinding machine 10 is disposed so that shaft 46 and elongated member 30 are mounted in an upright position so that the longitudinal axes thereof are coextensive with the longitudinal axis of kingpin 24. Hand wheel 76 is actuated to raise or lower sleeve 74 and thereby first frame 16 so that grinding wheel 130 carried by second frame 18 is disposed adjacent bearing surface 22, the surface to be ground. Set screw 88 is then actuated to engage shaft 46 to preclude the movement of sleeve 74 relative to the latter in the event that hand wheel 76 is accidentally turned. In order to fix the position of first frame 16 relative to sleeve 74 while the positioning of grinding wheel 130 relative to bearing surface 22 is accomplished, a pin is inserted in the openings of projections 84 and 86 on the upper and lower ends of sleeve 74 and collar 68 respectively. Grinding wheel 130 is then brought into engagement with the surface of kingpin 24 to be ground, it being noted that the latter is built up by adding a quantity of material to the worn bearing surface 22, as by welding. When grinding wheel 130 is brought into engagement with the surface to be ground, hand wheels 152 and 160 are rotated until hand wheel 152 engages lug 142 and the opposite extremity 162 of rod 140 engages the recess 164 of boss 166. It is clear therefore, that frames 16 and 18 are thereby in fixed relative positions and remain therein so as first frame 16 rotates about shaft 46.

As first frame 16 and thereby second frame 18 rotate about shaft 46, grinding wheel 130 engages the complete outer surface of the surface to be ground, it being clear that grinding wheel 130 is capable of grinding the surface only to a predetermined depth due to the fixed position of second frame 18 relative to first frame 16. Since the longitudinal axes of shaft 46 and member 30 are coincident with the longitudinal axis of kingpin 24, and since grinding wheel 130 rotates about an axis parallel with shaft 46, the surface ground by grinding wheel 130 is substantially concentric with the longitudinal axis of kingpin 24, if the grinding surface of grinding wheel 130 is concentric with the axis of shaft 117.

Hand wheel 76 is actuated to raise and lower sleeve 74 and thereby first and second frames 16 and 18 when set screw 88 is moved out of engagement with shaft 46. This action permits grinding wheel 130 to engage the surface to be ground above or below the original portion of the surface engaged thereby. In the embodiment of the instant invention as illustrated in the drawings, frames 16 and 18 are manually operated so that frame 16 rotates about shaft 46 and grinding wheel 130 engages the surface to be ground, but it is conceivable that frames 16 and 18 may be caused to rotate about shaft 46 by a power actuated means.

After the surface has been ground to a predetermined depth, hand wheels 152 and 160 are actuated so as to swing frame 18 toward frame 16 and thereby cause grinding wheel 130 to move toward the surface to be ground. Thereupon, the rotation of frames 16 and 18 is commenced and hand wheel 76 is actuated to cause grinding wheel 130 to cover the range of the bearing surface. This procedure is continued until bearing surface 22 has been ground to a dimension satisfying the design requirements thereof, whereupon second frame 18 is swung away from first frame 16 and shaft 46 and member 30 is removed from beneath kingpin 24.

To assure that the grinding surface of grinding wheel 130 remains concentric with the axis of shaft 117, upper stretch 50 of shaft 46 is provided with a perforation 168 therethrough for receiving a tool 170 having a handle 172 and an elongated shaft 174 embedded in handle 172. Shaft 174 is provided with a diamond head 176 at the extremity thereof spaced from handle 172, head 176 being engageable with the grinding surface of grinding wheel 130 when the latter is lowered so as to be in alignment with perforation 168 in upper stretch 50. A setscrew 178 is threadably received in stretch 50 and engageable with shaft 174 to secure the latter to stretch 50 while the grinding surface of grinding wheel 130 is engaged by head 176.

To maintain second frame 18 in a fixed position relative to first frame 16, a pair of spaced blocks 178 and 179 (FIG. 8), are disposed between section 60 and segment 90 and are interconnected by a bolt 180. Blocks 178 and 179 are provided with beveled outer edges 182 engageable with the respective outer surfaces of upright section 60 and upright segment 90, block 179 being internally tapped. Frame 18 may thus be held while adjustment is made to assure parallelism between the axes of kingpin 24 and shaft 117, but bolt 180 is released prior to placing the machine in use.

It is clear that grinding machine 10 provides a means for accurately grinding the bearing surface 22 of kingpin 24 so that the surface is concentric with the longitudinal axis of kingpin 24 to permit the use of the original kingpin and thereby preclude the replacement thereof with a new pin. By the construction of grinding machine 10, the bearing surface 22 may be progressively ground to the desired dimension by the judicious manipulation of hand wheels 152, 160 and 76 so that the grinding surface of grinding wheel 130 completely engages the entire surface to be ground by orbiting the surface responsive to the rotation of first frame 16 on shaft 46. Since second frame 18 is fixed relative to first frame 16, grinding wheel 130 grinds the surface only to a depth corresponding to the adjustment of hand wheels 152 and 160 so that the surface is accurately ground to conform to the design requirements thereof.

Having thus described the invention what is claimed as new and desired to be secured by Letters Patent is:

1. A machine for grinding the external bearing surface of the kingpin of a fifth wheel device secured to the trailer portion of a tractor-trailer combination, said machine comprising: an elongated tubular member; a universal joint connected to said member at one end thereof and adapted to engage a base for maintaining said member in one of any number of predetermined positions relative to said base; elongated structure shiftably received within said member; means on said member and operably coupled with said structure for shifting the latter along the longitudinal axis thereof relative to said member, said structure being provided with an extremity engageable with said kingpin in supporting relationship thereto and to said trailer portion; a frame mounted on said structure for rotation relative thereto about the longitudinal axis thereof; means shiftably mounted on said frame for movement toward and away from said structure and engageable with said surface for grinding the latter; and means on said frame and said grinding means for selectively maintaining the latter in a predetermined position relative to the frame as the latter rotates about said structure, whereby the device may be progressively ground responsive to movement of said grinding means toward said structure.

2. In a grinding machine as set forth in claim 1, wherein is provided actuatable screw means within said member and operably coupled with said frame for shifting the latter and thereby said grinding means longitudinally of said structure when said screw means is actuated.

3. In a grinding machine as set forth in claim 1, wherein a portion of said structure is externally threaded and is at least partially disposed within said member, and including a sleeve surrounding said threaded portion and in engagement with said frame, and means engageable with said sleeve for shifitng said frame and said grinding means, said last mentioned means including a hand wheel threadably mounted on said portion.

4. A machine for grinding the external bearing surface of the kingpin of a fifth wheel device, said machine comprising: elongated structure having an extremity engageable with said kingpin and adapted to be disposed beneath the latter in supporting relationship thereto; means pivotally coupled to the structure at the opposite extremity thereof for permitting said structure to be disposed uprightly on a supporting surface in any one of a number of positions relative to said supporting surface; a frame mounted on said structure for rotation relative thereto about the longitudinal axis thereof; means shiftably mounted on said frame for movement toward and away from said structure and engageable with said bearing surface for grinding the latter; and means on said frame and said grinding means for selectively maintaining the latter in a predetermined position relative to the frame as the latter rotates about said structure whereby the device may be progressively ground responsive to the movement of said grinding means toward said structure.

5. A machine as set forth in claim 4, wherein said structure is provided with a stop mounted thereon for movement into any one of a number of longitudinally spaced locations intermediate the extremities thereof, said stop being engageable with said frame in supporting relationship thereto.

6. The machine as set forth in claim 5, wherein said structure is provided with a longitudinally extending, threaded portion, said stop including an extension threadably mounted on said portion for movement longitudinally of said structure.

7. A machine for grinding the external bearing surface of the kingpin of a fifth wheel device, said machine comprising: an elongated structure having an extremity engageable with said kingpin and adapted to be disposed beneath the latter in supporting relationship thereto; means pivotally coupled to the structure at the opposite extremity thereof for permitting said structure to be disposed uprightly on a supporting surface in any one of a number of positions relative to said supporting surface; a first frame mounted on said structure for rotation relative thereto about the longitudinal axis thereof and extending outwardly therefrom; a second frame pivotally mounted on said first frame at the outer extremity of the latter for movement relative thereto toward and away from said structure; a grinding device carried by said second frame and engageable with said bearing surface; and means on said frames for selectively maintaining the second frame in any one of a number of positions relative to said first frame as the latter rotates about said structure whereby the bearing surface may be progressively ground by said grinding device.

8. A machine as set forth in claim 7, wherein said maintaining means includes screw means threadably carried by one of said frames and engageable with the other frame for interconnecting the frames and for permitting swinging movement of the second frame relative to the first frame.

References Cited in the file of this patent

UNITED STATES PATENTS

| | | |
|---|---|---|
| 2,257,619 | Prill | Sept. 30, 1941 |
| 2,761,440 | Schwab | Sept. 4, 1956 |
| 2,818,695 | Lockwood | Jan. 7, 1958 |

FOREIGN PATENTS

| | | |
|---|---|---|
| 337,189 | Great Britain | Oct. 30, 1930 |